(12) United States Patent
Pierrot et al.

(10) Patent No.: US 9,909,452 B2
(45) Date of Patent: Mar. 6, 2018

(54) DEVICE FOR SEALING BETWEEN THE COAXIAL SHAFTS OF A TURBOMACHINE

(71) Applicant: SNECMA, Paris (FR)

(72) Inventors: Arnaud Jean-Marie Pierrot, Moissy-Cramayel (FR); Serge Rene Morreale, Moissy-Cramayel (FR)

(73) Assignee: SNECMA, Paris (FR)

( * ) Notice: Subject to any disclaimer, the term of this patent is extended or adjusted under 35 U.S.C. 154(b) by 484 days.

(21) Appl. No.: 14/390,726

(22) PCT Filed: Mar. 8, 2013

(86) PCT No.: PCT/FR2013/050485
§ 371 (c)(1),
(2) Date: Oct. 3, 2014

(87) PCT Pub. No.: WO2013/150198
PCT Pub. Date: Oct. 10, 2013

(65) Prior Publication Data
US 2015/0063981 A1    Mar. 5, 2015

(30) Foreign Application Priority Data

Apr. 5, 2012  (FR) ...................................... 12 53133

(51) Int. Cl.

| | |
|---|---|
| *F01D 25/18* | (2006.01) |
| *F16J 15/40* | (2006.01) |
| *F16J 15/42* | (2006.01) |
| *F16J 15/54* | (2006.01) |
| *F16J 15/34* | (2006.01) |

(Continued)

(52) U.S. Cl.
CPC ............ *F01D 25/183* (2013.01); *F02C 3/067* (2013.01); *F02C 7/28* (2013.01); *F16J 15/34* (2013.01); *F16J 15/40* (2013.01); *F16J 15/42* (2013.01); *F16J 15/54* (2013.01); *F01D 11/02* (2013.01);

(Continued)

(58) Field of Classification Search
CPC ........ F01D 11/02; F01D 11/04; F01D 25/183; F05D 2240/55; F05D 2240/58; F05D 2240/581; F16J 15/54; F16J 15/42; F16J 15/40; F16J 15/3448
See application file for complete search history.

(56) References Cited

U.S. PATENT DOCUMENTS

| | | | |
|---|---|---|---|
| 6,196,790 B1 * | 3/2001 | Sheridan | F01D 11/003 415/111 |
| 2012/0043725 A1 * | 2/2012 | Jahn | F01D 11/003 277/306 |

FOREIGN PATENT DOCUMENTS

| | | |
|---|---|---|
| EP | 0 083 266 | 7/1983 |
| EP | 0 831 204 | 3/1998 |

(Continued)

OTHER PUBLICATIONS

International Search Report issued for International Application No. PCT/FR2013/050485, dated May 21, 2013.

(Continued)

*Primary Examiner* — Igor Kershteyn
*Assistant Examiner* — Brian P Wolcott
(74) *Attorney, Agent, or Firm* — Pillsbury Winthrop Shaw Pittman LLP

(57) ABSTRACT

A device for sealing the coaxial shafts of a turbomachine includes an annular seal able to perform sealing by contact with the outer shaft, and a lubricating device to lubricate the region of contact between the annular seal and the outer shaft.

16 Claims, 4 Drawing Sheets

Figure 1:
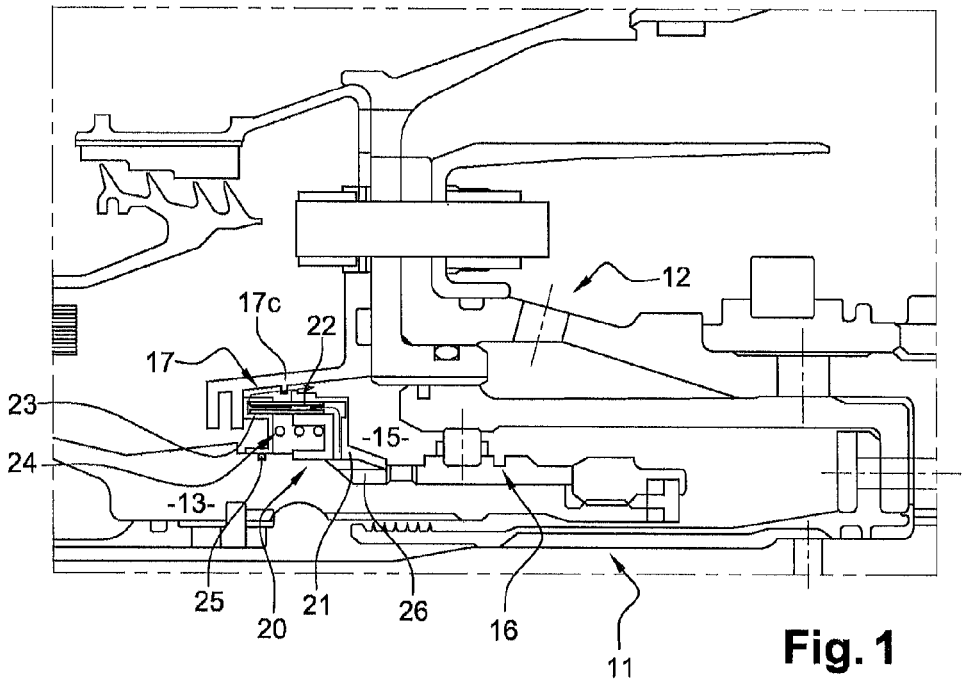

(51) Int. Cl.
*F02C 3/067* (2006.01)
*F02C 7/28* (2006.01)
*F01D 11/02* (2006.01)

(52) U.S. Cl.
CPC ....... *F05D 2240/55* (2013.01); *Y10T 29/4932* (2015.01)

(56) References Cited

FOREIGN PATENT DOCUMENTS

| | | |
|---|---|---|
| EP | 0 967 424 | 12/1999 |
| EP | 1 496 294 | 1/2005 |
| EP | 2 420 649 | 2/2012 |
| GB | 2 216 964 | 10/1989 |

OTHER PUBLICATIONS

Search Report and Written Opinion issued for French Patent Application No. 1253133, dated Jan. 18, 2013.

\* cited by examiner

Cross-section A-A

Cross-section A-A

DEVICE FOR SEALING BETWEEN THE COAXIAL SHAFTS OF A TURBOMACHINE

CROSS REFERENCE TO RELATED APPLICATIONS

This application is the U.S. National Stage of PCT/FR2013/050485, filed Mar. 8, 2013, which in turn claims priority to French Patent Application No. 1253133 filed Apr. 5, 2012, the entire contents of all applications are incorporated herein by reference in their entireties.

The present invention relates to the field of turbomachines and sealing systems between two coaxial rotating shafts.

The present invention more particularly relates to a dynamic sealing device arranged between two coaxial rotating shafts of a turbomachine.

In a turbomachine, it is necessary to define and isolate an enclosure surrounding a mechanical member such as a bearing or a gear provided between two rotating shafts, such as for example the high pressure rotor and the low pressure rotor. In this enclosure, oil is injected to lubricate and cool the mechanical member. The insulation of the enclosure requires in particular a sealing device between both rotating shafts.

It is known to use sealing devices without contact in this type of application. However, the sealing devices without contact, of the labyrinth type, require a high air flow rate and it is sometimes difficult to achieve the desired enclosure pressurization. Furthermore, an air-oil mixture is created in the enclosure, which requires a deoiling device before discharging air. The compromise is thus difficult to achieve and these sealing devices do not always allow to achieve the performance aimed at. Finally, this type of seal requires the presence of a deoiling device which is expensive, bulky and heavy because of the high oiled air flow rate to treat.

It is also known to use sealing devices with contact, or inter-shaft seal, of the carbon seal or even brush seal type. However, these devices are brittle and have a high risk of heat divergence in case of contact between the seal and the adjacent metal rings or glass plates, in particular during straight turning phases, i.e. during a relative axial displacement.

Within this context, the invention aims at providing a sealing device, adapted to operate with co-rotating or contra-rotating rotating shafts, enabling the above mentioned problems to be solved.

To that end, the invention provides a device for sealing between the coaxial shafts of a turbomachine including an annular seal able to perform sealing by contact with the outer shaft, said device being characterised in that it includes lubricating means able to lubricate the region of contact between said annular seal and said outer shaft.

Thus, the device according to the invention enables the advantages of a sealing device with contact (good performance) to be combined with a lubrication of the contact allowing to get rid of wear or heat divergence risks in the region of contact.

The device for sealing between the coaxial shafts of a turbomachine according to the invention can also have one or more of the characteristics below, considered singly or according to all the technically feasible combinations:

the contact between said annular seal and said outer shaft is ensured by elastic means and/or hydraulic means;

said hydraulic means are formed by a cylinder cooperating with a plurality of pistons so as to exert a strain on said annular seal;

the pistons are integral with said annular seal;

the hydraulic strain exerted on said plurality of pistons is made by centrifugation of a hydraulic fluid inside said cylinder;

part of said plurality of pistons or all of said plurality of pistons has ports able to convey hydraulic fluid to the region of contact between the annular seal and the outer shaft;

said annular seal includes ports positioned facing ports of the pistons;

the device includes an elastic segment ensuring sealing between said annular seal and said inner shaft.

One object of the invention is also to provide a turbomachine including a low pressure rotor and a high pressure rotor characterised in that it includes a sealing device according to the invention to perform sealing of an enclosure surrounding a mechanical member between said low pressure shaft and said high pressure shaft.

One object of the invention is also to provide a method of fastening two coaxial rotating shafts (of a turbomachine including a sealing device according to the invention, able to perform sealing of an enclosure surrounding a mechanical member between said two rotating shafts, said method including the steps of:

fastening a first part of the outer shaft about said inner shaft, said first part comprising means for securing said first part on the main part of the outer shaft;

mounting said sealing device on said inner shaft;

axially blocking said first part of the outer shaft;

fastening the main part of said outer rotating shaft with the inner rotating shaft, securing said first part of the outer shaft with said main part of the outer shaft;

axially deblocking said first part;

adjusting the fastening so as to position said outer shaft in its operating position.

Advantageously, the axial blocking step is made by means of a first scalloped rib arranged on said outer shaft cooperating with a second scalloped rib arranged on said cylinder forming a bayonet system.

Figure 2:
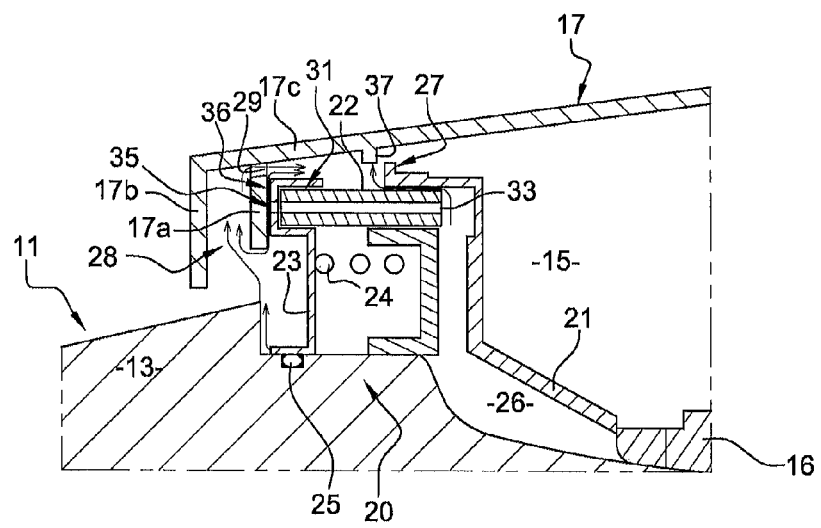
Figure 11A:
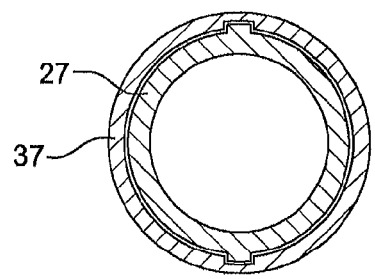
Figure 11B:
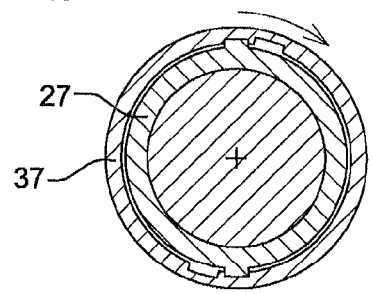

Further characteristics and advantages of the invention will become clearer from the description thereof given below, by way of indicating and in no way limiting purposes, in reference to the appended figures, among which:

FIG. 1 schematically illustrates an overview of a device for sealing between coaxial shafts according to the invention which is positioned in its environment between the inner shaft and the outer shaft of a turbomachine;

FIG. 2 illustrates a detailed view of the sealing device according to the invention enabling to ensure sealing of the enclosure including a mechanical member illustrated in FIG. 1;

FIGS. 3 to 10 schematically illustrate the different steps of the method for mounting said sealing device according to the invention in a turbomachine including a low pressure rotating shaft and a high pressure rotating shaft;

FIGS. 11a and 11b illustrate the principle of the bayonet system used to assemble two rotating shafts upon positioning the sealing device.

Throughout the figures, common elements bear the same reference numerals unless otherwise indicated.

FIG. 1 represents an overview of a sealing device 20 positioned at an enclosure 15 surrounding a mechanical member 16 provided between an inner rotating shaft 11 and an outer rotating shaft 12. FIG. 2 is a more detailed view of the enclosure 15 and the sealing device illustrated in FIG. 1.

In the exemplary embodiment illustrated in FIGS. 1 and 2, the inner rotating shaft 11 is a high pressure turbine rotor of a turbomachine and the outer rotating shaft 12 is a low pressure turbine rotor of a turbomachine.

The sealing device 20 according to the invention includes:

a cylinder 21 secured to the inner shaft 11, and more particularly to the journal 13 of the high pressure rotor according to the embodiment illustrated in FIG. 1;

sealing means 23 formed by an annular shaped seal concentrically positioned with respect to the inner shaft 11;

elastic means 24, such as for example compression strings, able to exert a strain onto the sealing means 23;

pistons 22 distributed on the circumference of the annular seal 23, arranged between the cylinder 21 and the sealing means 23 such that the pistons actuated by the cylinder 21 exert a strain onto the sealing means 23;

an annular segment 25 enabling the hydraulic fluid leaks to be restricted on the edge of the annular seal 23 between the annular seal 23 and the journal 13 of the inner shaft 11.

According to the embodiment of the invention, illustrated in FIGS. 1 and 2, the annular segment 25 is arranged in an annular groove provided to that end in the journal 13. In this advantageous positioning, the annular segment 25 does not require a particular pre-strain since the segment expands under the effect of the centrifugal force, thus ensuring sealing between the annular seal 23 and the journal 13.

In operation, the entire sealing device 20 rotates at the rate of the inner shaft 11. Thus, the only friction strains to which the annular segment 25 is subjected are due to the relative axial displacement between both rotating shafts, which does not generate any warming. These axial displacements are conventionally called "straight turning" in the field of turbomachines and correspond to the relative axial displacement between the high pressure rotor and the low pressure rotor during the transitory operating phases of the turbomachine.

The annular seal 23 is a metal seal or a carbon seal.

The annular seal 23 has a plurality of circularly distributed blind bores 31, each of said bores being adapted to receive a piston 22. The diameter of the bores is adapted to make a force-fit connection with the pistons 22, so as to secure and kinematically connect the pistons 22 with the annular seal 23.

The outer wall 36 of the annular seal 23 is able to come into contact with a first annular wall 17a making an element of the flange 17 of the outer shaft 12 and bounding the enclosure 15, so as to perform sealing of this enclosure 15; the flange 17 including a first annular wall 17a and a second annular wall 17b.

The outer wall 36 of the annular seal 23 is held against the annular flange 17a by a pressure of the pistons 22 which are actuated by the centrifugation of a hydraulic fluid in the cylinder 21 upon operating the turbomachine and by elastic means 24, such as strings, positioned between the annular seal 23 and the cylinder 21 so as to ensure a permanent contact between the seal 23 and the first flange 17a during shutdown phases of the turbomachine, in particular when the oil pressure exerted onto the pistons 22 is too low.

A retainer 26 is provided in the lower part of the cylinder 21 so as to ensure a permanent oil stock. This oil stock is fed by dedicated oil, and conveyed, for example by the inner ring of the roller bearing within the scope of an application in a turbomachine as illustrated in FIGS. 1 to 2.

The number of pistons 22 will be adjusted so as to balance the axial strains on the annular seal 23 by taking into account:

the upstream and downstream air pressures;
the force of the elastic means 24;
the resistance to the displacement of the annular seal 23 generated in particular by the friction of the segment-annular seal connection.

The pistons 22 are advantageously dimensioned so as to ensure a permanent contact between the annular seal 23 and the first annular wall 17a in all the operating situations of a turbomachine, including during transients and so as to generate a thermal power due to the friction of the seal 23 against the first annular wall 17a as low as possible.

All or part of the pistons 22 have in their structure bores passing longitudinally through the structure of the piston 22 so as to form an inner channel able to convey a hydraulic fluid flow from the cylinder 21 to the region of contact between the annular seal 23 and the annular flange 17a via injectors provided at the end of the pistons 22. To that end, the wall forming the bottom of the blind bores 31 has a port, facing the bores 33 of the pistons 22, communicating with an annular groove 35 arranged on the outer wall 36.

Such an arrangement thus allows a hydraulic fluid flow from the cylinder 21 to the outer wall 36 thus ensuring a permanent lubrication of the region of contact by making an oil film on the circumference of the annular seal 23.

The lubrication of the region of contact also enables a permanent cooling of this region between the annular seal 23 and the first annular wall 17a to be ensured, thus preventing a premature wear of the sealing device 20.

The radial position of the blind bores 31, with respect to the axis of revolution of the ring corresponds to the diameter of implantation of the pistons 22 in the cylinder 21.

Another part of the oil exiting the pistons 22 leaks by the clearance present between the pistons 22 and the cylinder 21 so as to ensure a lubrication between both parts, in particular during relative displacements due to straight turnings during transients.

All the oil is recovered on the conical wall 17c by centrifugal effect and discharged to a conventional oil recovery system of the enclosure 15 formed by a conduit at the bottom of the enclosure connected to a recovering pump.

To recover possible oil leaks that would come from the segment/seal connection of even seal/flange connection, the first annular wall 17a and the second annular wall 17b form an oil recovery bowl 28. This recovery bowl 28 is located upstream of the sealing system 20. At the bottom of this recovery bowl 28, the first annular wall 17a includes at least one bore 29 at the junction between the first annular wall 17a and the conical wall 17c enabling these leaks to be reintroduced into the enclosure 15. The inner diameter of the second annular wall 17b (i.e. its opening diameter) is lower than the inner diameter of the first annular wall 17a such that the second annular wall 17b plays the role of a recovery barrier of the hydraulic fluid leaks upon operating the turbomachine. Advantageously, the inner diameter of this second annular wall 17b should be minimized as much as possible as a function of the geometrical requirements of the environment.

The conical wall 17c also has a scalloped rib 37. This rib 37 is used for the mounting phase and will be detailed later. This scalloped rib 37 thus has recessed parts on the circumference of the conical wall 17c enabling oil to be efficiently flown onto this wall 17c. In order to further improve the oil flow onto this wall, the solid parts of the scalloped rib 37 can have bores.

FIGS. 3 to 10 illustrate the different mounting steps of the sealing device 20 in a turbomachine including a high pressure shaft 11 and a low pressure shaft 12.

Figure 3:
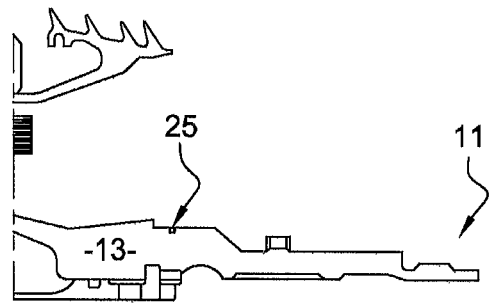

FIG. 3 illustrates the first step of the method of mounting consisting in installing the segment 25 in the housing intended to that end in the downstream part of the journal 13 of the high pressure shaft 11.

Figure 4:
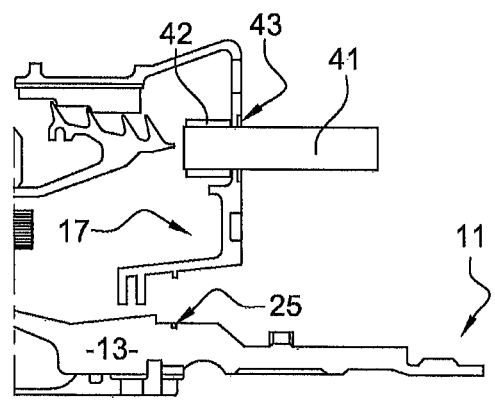

FIG. 4 illustrates the second step of the mounting method. This second step consists in bringing the flange 17 of the low pressure turbine including the annular walls 17a and 17b. This flange is equipped with studs which will enable this part of the low pressure turbine to be assembled to the module of the low pressure turbine so as to form the entire low pressure shaft. The studs 41 are integral with the flange 17 via nuts 42 and oblong bores 43.

Figure 5:
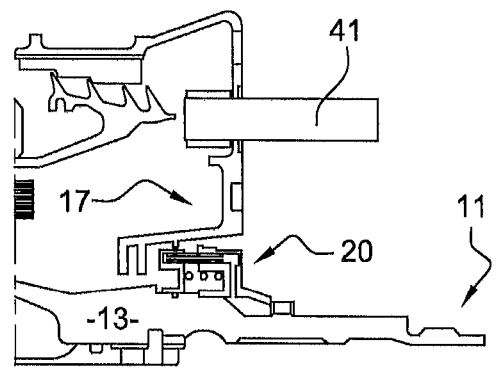

FIG. 5 illustrates the third step of the mounting method consisting in setting up the sealing device 20.

Figure 6:
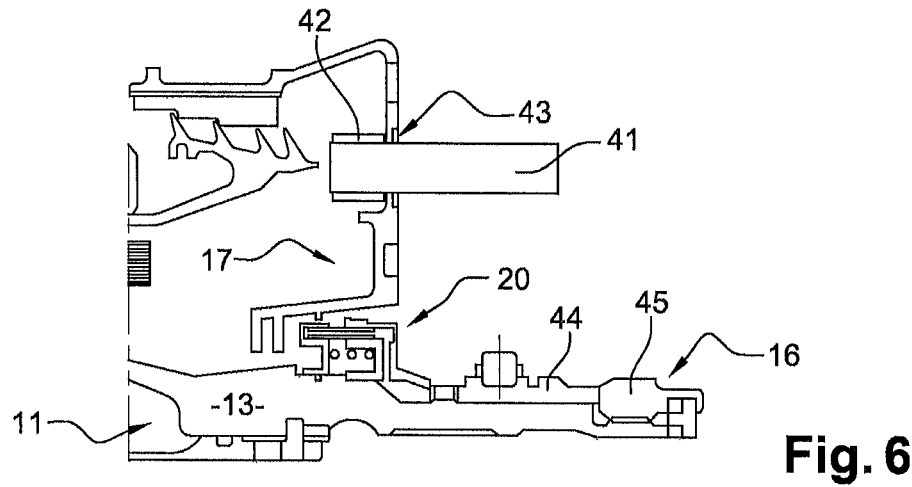
Figure 7:
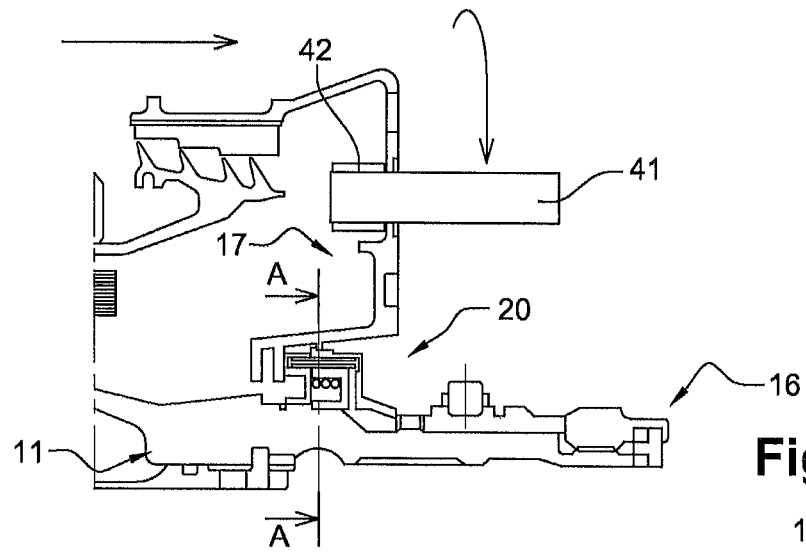

FIG. 6 illustrates the fourth step of the mounting method. This fourth step of the method consists in positioning the mechanical member 16 onto the high pressure shaft. In the embodiment illustrated, the mechanical member 16 is formed by the bearing n° 4 integral with the nut means; the assembly thus forming the entire module of the high pressure shaft 11, FIG. 7 illustrates the fifth step of the mounting method according to the invention consisting in latching the position of the flange 17 by means of a "bayonet" system. The bayonet system is formed by the scalloped rib 37 arranged on the conical wall 17c of the flange 17 of the low pressure shaft 12 as well as by a scalloped rib 27 arranged on the cylinder 21.

FIGS. 11a and 11b more precisely illustrate the principle of the bayonet latching system formed by both scalloped ribs 37, 27 (only two teeth being represented so as to simplify the figure).

More precisely, FIG. 11a represents the unlatched position of the system in which the flange 17 of the low pressure shaft 12 is axially movable with respect to the sealing device 20; FIG. 11b represents the latched position of the system in which the flange 17 is axially blocked with respect to the device 20.

Thus, in this fifth latching step, the flange 17 is axially displaced so as to engage in the scalloped rib 27 of the cylinder 21 acting as a centring piece. Once engaged, a slight rotation of the flange 17 along its axis of rotation enables to switch from the unlatched position to the latched position illustrated in FIG. 11b, thus axially and radially keeping the flange 17 in position.

In the latched position, the elastic means 24 are compressed.

Figure 8:
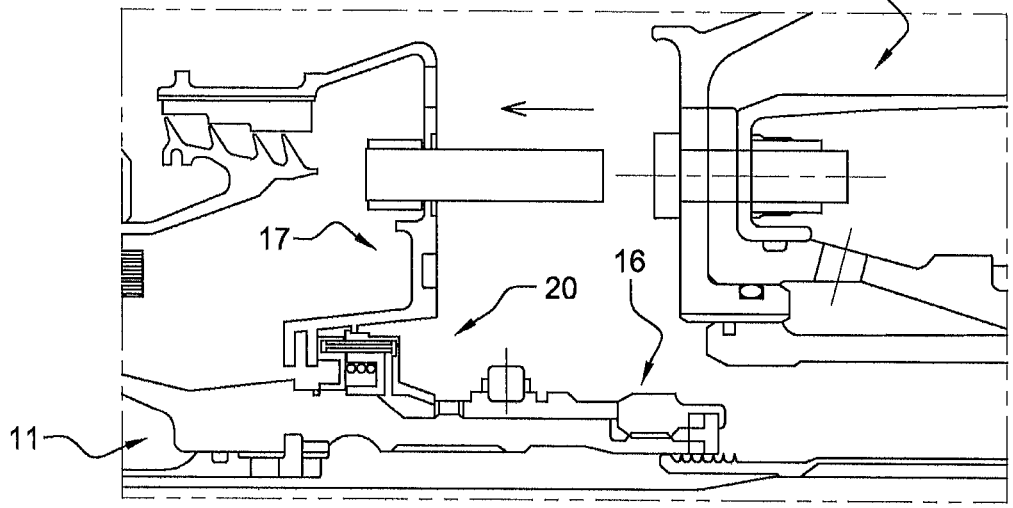

FIG. 8 illustrates the sixth step of the method consisting in fastening the low pressure turbine module preassembled and equilibrated on the flange 17 in position. To that end, the module has bores enabling the module to be fastened to the flange 17 via the studs 41 and the nuts. Thus, the module and flange assembled form the entire low pressure shaft 12.

Figure 9:
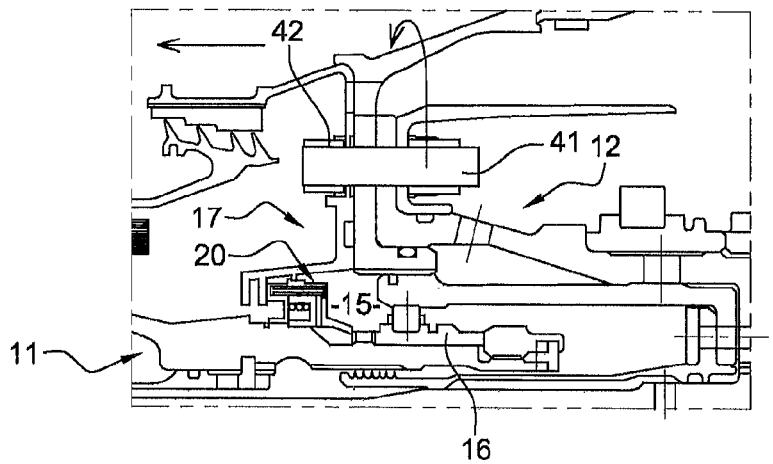

FIG. 9 illustrates the seventh step consisting in unlatching the bayonet system by rotating the low pressure shaft 12 in the reverse direction of the direction of rotation of the fifth step, and then to disengaging the low pressure shaft from the sealing system by axial sliding so as to put it into position (axial position). Upon axially displacing the low pressure shaft 12, the elastic means 24 are expanded and enable the annular seal 23 to be pressed against the first annular wall 17a, as previously described, so as to ensure sealing of the enclosure 15 as soon as the turbomachine is started up but also during shutdown phases of the turbomachine.

Figure 10:
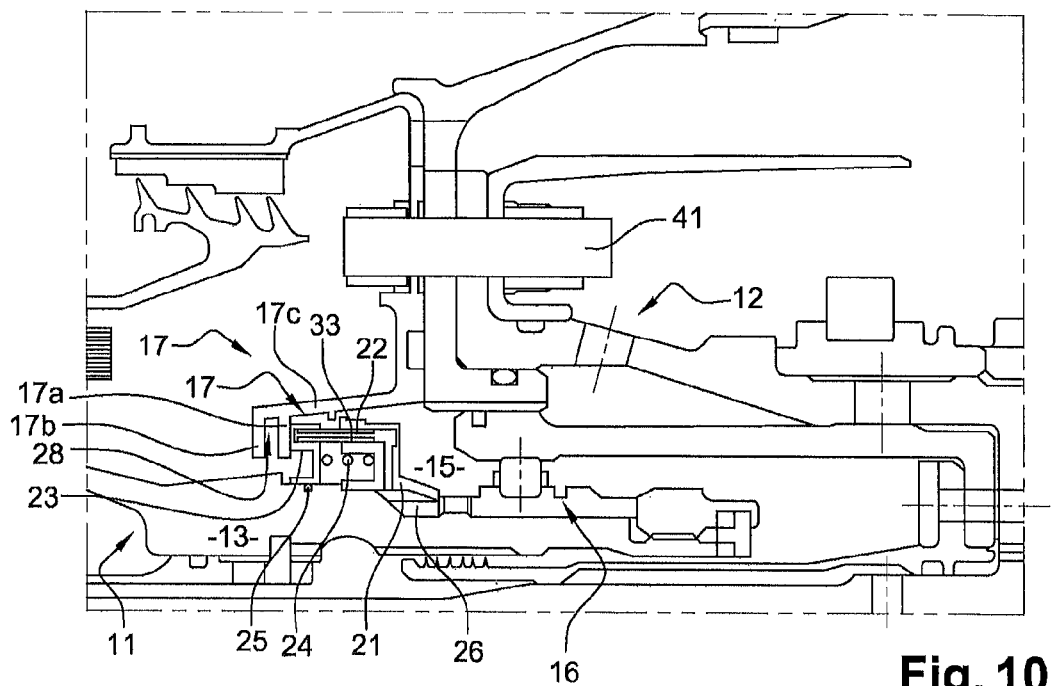

FIG. 10 illustrates the final position of the rotating shafts as well as the sealing device 20.

Thus, the device according to the invention enables to ensure an efficient and robust sealing between two rotating parts (for example a high pressure shaft and a low pressure shaft of a turbomachine) by making sealing by contact, offering a good performance, and permanent lubrication of the contact thus avoiding the warming risks and thermal divergence.

The invention has been mainly described with a high pressure shaft and a low pressure shaft of a turbomachine; however, the invention is also applicable to other coaxial rotating shafts.

The device according to the invention is particularly adapted to be used with two contra-rotating rotating shafts: however, the invention is also applicable with two co-rotating rotating shafts.

The invention claimed is:

1. A device for sealing between coaxial shafts of a turbomachine, comprising:
   an annular seal configured to perform sealing by contact with an outer shaft of the coaxial shafts, and
   a lubricating device configured to lubricate a region of contact between said annular seal and said outer shaft, wherein the contact between said annular seal and said outer shaft is ensured by a hydraulic device formed by a cylinder cooperating with at least one piston so as to exert a strain onto said annular seal.

2. The device for sealing between the coaxial shafts of a turbomachine according to claim 1, wherein the contact between said annular seal and said outer shaft is ensured by an elastic device and said hydraulic device.

3. The device for sealing between the coaxial shafts of a turbomachine according to claim 1, wherein the at least one piston includes a plurality of pistons, wherein said hydraulic device is formed by the cylinder cooperating with the plurality of pistons so as to exert the strain onto said annular seal.

4. The device for sealing between the coaxial shafts of a turbomachine according to claim 3, wherein the plurality of pistons are integral with said annular seal.

5. The device for sealing between the coaxial shafts of a turbomachine according to claim 3, wherein a hydraulic strain exerted on said plurality of pistons is made by centrifugation of a hydraulic fluid inside said cylinder.

6. The device for sealing between the coaxial shafts of a turbomachine according to claim 3, wherein part of said plurality of pistons or all of said plurality of pistons has ports able to convey hydraulic fluid to the region of contact between the annular seal and the outer shaft.

7. The device for sealing between the coaxial shafts of a turbomachine according to claim 6, wherein said annular seal has an annular groove arranged facing the ports of the plurality of pistons.

8. The device for sealing between the coaxial shafts of a turbomachine according to claim 1, comprising an elastic segment ensuring sealing between said annular seal and an inner shaft.

9. A turbomachine including a low pressure rotor, a high pressure rotor and a sealing device according to claim 1, to perform sealing of an enclosure surrounding a mechanical member between a low pressure shaft and a high pressure shaft.

10. The device for sealing between the coaxial shafts of a turbomachine according to claim 1, wherein an inner shaft of the coaxial shafts is a high-pressure, rotating turbine rotor, and wherein the outer shaft is a low-pressure, rotating turbine rotor.

11. The device for sealing between the coaxial shafts of a turbomachine according to claim 1 comprising an annular segment configured to restrict hydraulic fluid leaks to an edge of the annular seal between the annular seal and a journal of an inner shaft of the coaxial shafts.

12. The device for sealing between the coaxial shafts of a turbomachine according to claim 3, wherein a number of the plurality of pistons is adjusted so as to balance axial strain on the annular seal by taking into account:
- upstream and downstream air pressures,
- force of an elastic device, and/or
- resistance to displacement of the annular seal generated by friction.

13. The device for sealing between the coaxial shafts of a turbomachine according to claim 1, wherein an inner shaft of the coaxial shafts contra-rotates relative to the outer shaft.

14. The device for sealing between the coaxial shafts of a turbomachine according to claim 1, wherein an inner shaft of the coaxial shafts rotates in a same direction relative to the outer shaft.

15. A method for fastening two coaxial rotating shafts of a turbomachine including a sealing device according to claim 1 configured to perform sealing of an enclosure surrounding a mechanical member between said two coaxial rotating shafts, said method comprising:
- fastening a first part of an outer rotating shaft of the two rotating shafts about an inner rotating shaft of the two rotating shafts, said first part comprising a fastener for securing said first part on a main part of the outer shaft;
- mounting said sealing device on said inner rotating shaft;
- axially blocking said first part of the outer rotating shaft;
- fastening the main part of said outer rotating shaft with the inner rotating shaft, securing said first part of the outer rotating shaft with the main part of the outer rotating shaft;
- axially unblocking said first part;
- adjusting the fastening so as to position said outer rotating shaft in its operating position.

16. The method for fastening two coaxial rotating shafts of a turbomachine according to claim 15, wherein said axial blocking is made by means of a first scalloped rib arranged on said outer rotating shaft cooperating with a second scalloped rib arranged on the cylinder forming a bayonet system.

* * * * *